United States Patent
Löfmark

[11] 3,974,447
[45] Aug. 10, 1976

[54] PILOT RECEIVER

[75] Inventor: Bengt Gustav Löfmark, Skarholmen, Sweden

[73] Assignee: Telefonaktiebolaget L M Ericsson, Stockholm, Sweden

[22] Filed: Jan. 24, 1974

[21] Appl. No.: 436,091

[30] Foreign Application Priority Data
Jan. 31, 1973   Sweden .............................. 7313161

[52] U.S. Cl. .............................. 325/1; 179/15 BP; 325/401; 329/50
[51] Int. Cl.² .......................................... H04J 1/02
[58] Field of Search ........ 179/15 BP, 15 BS, 15 FE, 179/15 FS; 325/59, 60, 62, 401, 1, 2, 320, 329, 330, 3; 329/110, 50, 122, 146; 330/26, 31

[56] References Cited
UNITED STATES PATENTS

| | | |
|---|---|---|
| 2,871,294 | 1/1959 | Stachiewicz ...................... 325/62 X |
| 2,965,717 | 12/1960 | Bell ................................... 325/62 X |
| 3,108,158 | 10/1963 | Jones ............................... 179/15 BP |
| 3,193,775 | 7/1965 | Herrero et al. ..................... 325/62 X |
| 3,289,082 | 11/1966 | Shumate ........................... 178/66 R |
| 3,522,537 | 8/1970 | Boughtwood ........................ 325/49 |

OTHER PUBLICATIONS

Electronics World, July 1965 pp. 84–88, "Selective Audio Amplifiers."
Electronics, Aug. 1968 18, Foldout From p. 85 "Basic Building Blocks . . .".

Primary Examiner—Benedict V. Safourek
Attorney, Agent, or Firm—Hane, Baxley & Spiecens

[57] ABSTRACT

A pilot receiver for level control in carrier frequency systems works with an intermediate frequency which is optimal from the viewpoint of the filter which is an integral part of the receiver and comprises in series connection, a phase-shift demodulator (quadrature demodulator), an active RC-filter and a rectifier.

6 Claims, 5 Drawing Figures

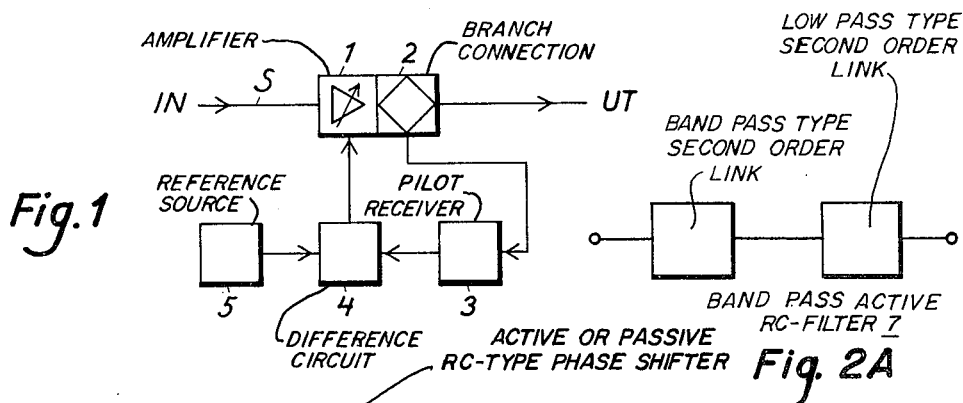
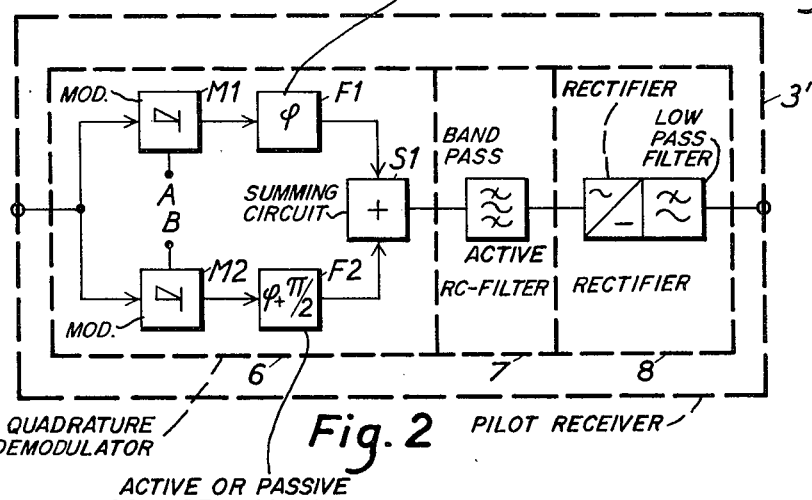
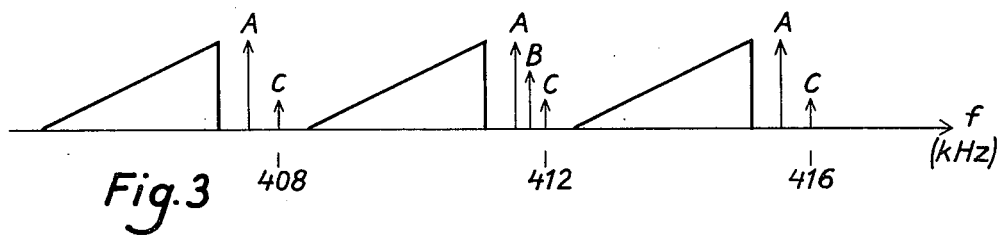
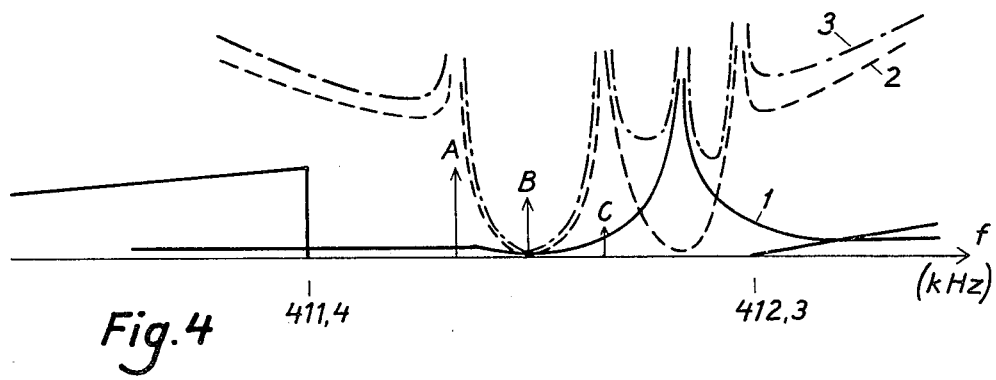

PILOT RECEIVER

The present invention relates to a pilot receiver, especially for level control in carrier frequency systems, which pilot receiver on its input terminal receives a traffic group with an associated pilot signal and on its output terminal delivers a direct voltage corresponding to the pilot signal amplitude on the input terminal.

THE PRIOR ART

For level control in carrier frequency systems pilot signals are used. These signals have frequencies set by CCITT recommendations, and are added to a respective traffic group at its formation and follow the group until it is dissolved. In the following, level control means a compensation of the attenuation, to which the signal is exposed when transmitted through a certain section of line. The level control can for example take place in intermediate repeaters on the transmission line, in terminal equipments or at through connection of groups. The attenuation is more or less frequency dependent, and therefore a corresponding compensation should also be frequency dependent. However, due to the impossibility of exactly predicting how the attenuation varies with the frequency one usually chooses to compensate by a flat, i.e. frequency independent compensation for every group. In this manner the level of the group is compensated so that the associated reference pilot returns to nominal value on the output of the intermediate repeater.

In order to separate information from the transmitted frequency band about the level of a certain pilot signal on the output of an intermediate repeater, a pilot receiver is arranged.

The heretofore most usual way to separate the information is by means of a very narrow bandpass filter belonging to the pilot receiver and especially designed and tuned for the pilot signal in question. One separates the pilot signal directly on the output of the intermediate repeater and after that this pilot signal is amplified and rectified. The demand for a narrow pass band at a relatively high frequency, that is small relative bandwidth for said filter, limits very much the choice of technique for the design of the filter. In principle one has been restricted to a crystal filter technique and a mechanical filter technique. These filters are more complicated and above all very expensive.

In order to reduce the costs for a total transmission system in which a number of pilot signals of different frequencies are included, the levels of which are to be controlled, one has for all the pilots tried to use a common pilot receiver, tuned to a certain given frequency. This latter method requires, however, on the one hand a demodulation of all the pilot signals to said given frequency and on the other hand requires some type of scanning device by means of which the pilot receiver can cyclically be connected to the different measuring points and associated control circuits. The disadvantage of this method is apparent since information about each separate pilot signal is only available periodically and then for only a short time interval.

In the German Auslegeschrift 1.947.918 a transmission system is described in which all the pilots certainly are demodulated to a common intermediate frequency, but where every pilot still has its own receiver. The intermediate frequency according to the described method is within a range where one for the pilot receiver is still limited to mechanical filter technique.

THE PURPOSE OF THE INVENTION

The purpose of the present invention is to achieve a pilot receiver, which makes it possible completely to relinquish the use of complicated, very space requiring and expensive crystal filters.

THE SOLUTION

The task is solved by designing a pilot receiver, which in series comprises a phase-shift demodulator for frequency translation and suppression of unwanted an side band, an active RC-filter of band pass type for separating of the translated pilot and a rectifier, which on its output gives a direct voltage corresponding to the pilot amplitude on the input of the receiver.

THE ADVANTAGES OF THE INVENTION

An advantage with the solution according to the present invention is that the chosen demodulation principle, besides giving the low intermediate frequency necessary for the following active RC-filter, of the magnitude 100 Hz, also has filter properties. The phase-shift demodulation functions as a filter with pass band on one side of the carrier frequency and stop band on the other followed by a conventional demodulation. This means among other things an automatic attenuation of the image frequency of the pilot with respect to the carrier frequency used during the demodulation.

Another advantage with the device according to the invention is that identical pilot receivers can be used for different pilot frequencies. The adaptation to a special pilot frequency consists of a change of frequency and maybe phase for the carrier frequencies connected to the phase-shift demodulator.

Another advantage is that neither transformers nor inductors are included in the pilot receiver. Included capacitances and resistances can furthermore be chosen so that it is possible to integrate totally and compactly the receiver. In such a design the cost for the total pilot receiver is of the same magnitude as the cost for one single crystal of which normally several are included in the filter itself in a conventional pilot receiver. The amplification of the RC-filter can besides make extra amplifiers unnecessary.

DRAWING LIST

The invention will in the following be described by means of an embodiment with reference to the accompanying drawing where:

FIG. 1 shows a part of a transmission line with pilot controlled intermediate repeater;

FIG. 2 shows an embodiment of a pilot receiver according to the invention; FIG. 2A shows a block diagram of an RC-filter.

FIG. 3 shows a part of a super group spectrum.

FIG. 4 shows attenuation characteristics for the phaseshift demodulator the following active RC-filter, and their sum characteristic.

DESCRIPTION

FIG. 1 shows an intermediate repeater with pilot control arranged in a conventional way and a transmission line S on which the traffic is presupposed to flow from left to right. A controlled amplifier 1 is on its output side connected to a branch connection 2 for branching of the signal to a pilot receiver 3. The pilot receiver 3 separates the information about the level of a certain pilot on the output of the amplifier 1 and delivers on its output a direct voltage corresponding to this level. A difference forming circuit 4 compares the direct voltage with a direct voltage from a reference unit 5, which last mentioned direct voltage corresponds to nominal pilot signal level on the output of the repeater 1. The direct voltage difference controls the adjustment of the amplifier 1 so that a nominal pilot level is obtained on the output of the amplifier.

FIG. 2 shows an embodiment of the pilot receiver 3' according to the invention. The receiver comprises three series connected units, a phase-shift demodulator 6, an active RC-filter 7 and a rectifier 8. The arrangement is supposed to be able to replace the pilot receiver 3 according to FIG. 1. The phase-shift demodulator 6 is designed in a conventional way as shown in for instance PROCEEDINGS OF THE IRE, vol. 44, pp. 1718–1743, December 1956, with two different signal paths, both connected to the input terminal, each comprising a modulator M1, M2 and a phase-shifting circuit F1, F2. The phase-shift demodulator is also known as a quadrature demodulator. The output signals from the phase-shifting circuits are superimposed in an adding circuit S1, the output of which constitutes the output of the phase shift demodulator.

Each modulator M1, M2 has a carrier input A, B. The phase-shifting circuits F1, F2 produce phase-shifts in their respective signal paths, the difference of which equals $\pi/2$ radians. The phase shifting circuits are preferably of the RC-type and can be either active or passive. The carrier inputs A, B of the modulators M1 and M2 are fed with carrier signals with the same frequency and a phase difference of $\pi/2$ radians. Thus, the carrier frequency source can be a free running oscillator oscillating at the carrier frequency and having an output connected directly to input A and also via a 90° phase shifter to input B. On these assumptions and with an input signal with a frequency above the frequency of the carrier, the phase-shift demodulator will give either an output signal with the difference frequency or zero output. In the same way an input signal with a frequency below the frequency of the carrier will give an output signal which equals zero or a signal with the difference frequency. Thus it is possible to suppress alternatively the side bands on both sides of the carrier frequency. The choice of the alternatives is carried out by shifting either the carrier signals to the two inputs A and B or by shifting the two phase-shifting circuits F1, F2. Thus the phase-shift demodulator can, besides the frequency transformation properties, achieve lowpass and highpass characteristic respectively in the vicinity of the carrier frequency.

Assume that on the transmission line S there is transmitted a supergroup containing frequencies 312–557 kHz (CCITT standardized). The associated reference pilot has the frequency 411.92 kHz. In FIG. 3 is shown a part of the spectrum of the supergroup with three speech channels, each represented by a triangle. The pointers A represent signals outside the speech band, the pointer B represents the above-mentioned reference pilot and the pointers C represent frequency components associated with carrier leaks. Furthermore assume that a carrier signal with the frequency 412 kHz is fed to the inputs A and B of the modulators M1 and M2 at which the carrier with the greatest phase angle is fed to the input A. On these assumptions the phase-shift demodulation will have low-pass properties. In FIG. 4 the curve 1 shows the attenuation characteristic of the phase-shift demodulation for the above mentioned case. The frequency transformation transforms the pilot signal to the difference frequency 80 Hz which signal thus together with the transformed speech-bands appears at the output terminal of the demodulator.

The active RC-filter 7 according to FIG. 2 has a resonance frequency which equals 80 Hz and an attenuation characteristic according to the curve 2 in FIG. 4. In this figure the attenuation characteristic is shown centered around 411.92 kHz. In FIG. 4 is also shown the total effect of phase-shift demodulation and filtering by means of the curve 3. From this figure it is evident how the pilot represented by the pointer B has been separated. The active RC-filter 7 preferably comprises two second order links connected in cascade wherein one link is of the band-pass type and the other of the low-pass type.

In order to achieve from the transformed pilot signal a direct voltage for control purposes there is connected to the output terminal of the filter 7 a rectifier 8 which also includes a low-pass filter. The rectifier 8 preferably comprises a mean-value detector whose output is connected to a low-pass active RC-filter.

We claim:

1. In an intermediate repeater of a carrier frequency system handling a traffic group-and-associated pilot signals, apparatus for controlling the level of signals passing through the repeater comprising:

a voltage controlled amplifier having a signal input for receiving the traffic group-and-associated pilot signals, a control signal input for receiving a control voltage whose amplitude controls the gain of the voltage controlled amplifier and a signal output; a branch circuit having a signal input connected to the signal output of said voltage controlled amplifier and first and second signal outputs for transmitting signals, said first signal output being adapted to further transfer the traffic group-and-associated pilot signals; a demodulator of the phase shift type for both frequency translating the pilot signal and for suppressing an unwanted sideband, said demodulator having an input connected to said second signal output of said branch circuit and having an output; an active RC-filter of the bandpass type connected to the output of said demodulator and having an output for passing only signals having a frequency equal to that of a translated pilot signal; a rectifier having an input connected to the output of said active RC-filter and having an output for delivering a direct voltage related to the received pilot signal amplitude, and coupling means for coupling the direct voltage to the control signal input of said voltage controlled amplifier.

2. The apparatus of claim 1 wherein said coupling means includes a reference voltage source and a difference amplifier having a first input connected to said reference voltage source, a second input connected to the output of said rectifier, and an output connected to the control signal input of said voltage controlled amplifier.

3. Apparatus according to claim 1 wherein said demodulator comprises two passive RC phase-shifting circuits.

4. Apparatus according to claim 1 wherein said demodulator comprises two active RC/phase shifting circuits.

5. Apparatus according to claim 1 wherein said rectifier comprising a mean-value forming circuit followed by an active RC-filter of the low-pass type for smoothing the rectified voltage.

6. Apparatus according to claim 1 wherein said active RC-filter comprises two second order links connected in cascade, one of which is of the band-pass type and the other of the low-pass type.

* * * * *